United States Patent [19]
Streusand et al.

[11] Patent Number: 4,926,021
[45] Date of Patent: May 15, 1990

[54] REACTIVE GAS SAMPLE INTRODUCTION SYSTEM FOR AN INDUCTIVELY COUPLED PLASMA MASS SPECTROMETER

[75] Inventors: Barry J. Streusand, Westminster; Raymond H. Allen, Louisville; Darrell E. Coons, Boulder, all of Colo.; Robert C. Hutton, Nantwich, United Kingdom

[73] Assignee: AMAX Inc., New York, N.Y.

[21] Appl. No.: 242,798

[22] Filed: Sep. 9, 1988

[51] Int. Cl.[5] .......... B23K 9/00
[52] U.S. Cl. .......... 219/121.59; 219/121.5; 219/121.51; 219/121.52; 315/111.51
[58] Field of Search .......... 219/121.48, 121.49, 219/121.5, 121.51, 121.52, 75, 121.59, 121.38; 315/111.21, 111.51; 313/231.41, 231.51

[56] References Cited

U.S. PATENT DOCUMENTS

| | | | |
|---|---|---|---|
| Re. 29,304 | 7/1977 | Greenfield et al. | 219/121.52 |
| 3,296,410 | 1/1967 | Hedger | 219/121.52 |
| 4,551,609 | 11/1985 | Falk | 315/111.51 |
| 4,578,560 | 3/1986 | Tanaka et al. | 219/121.52 |
| 4,665,296 | 5/1987 | Iwata et al. | 315/111.51 |
| 4,739,147 | 4/1988 | Meyer et al. | 315/111.51 |

*Primary Examiner*—M. H. Paschall
*Attorney, Agent, or Firm*—Michael A. Ciomke; Eugene J. Kalil

[57] ABSTRACT

A torch device is provided for use in preparing a sample of a gas or vapor for analysis by an analyzer. The torch device is comprised of an elongated cylindrical body with an inductively coupled plasma generating device located at its output or forward section. The torch includes a first tubular element for separately feeding a sample of reactive gas or vapor into a mixing chamber located rearward of said plasma generating means, a second tubular element for separately feeding a nebulizer flow of a plasma gas and including water or solvent vapor or aerosol thereof into the mixing chamber to thereby mix with said sample, and a third tubular element for maintaining a first sheath of plasma gas concentrically about the sample mixture as it enters the plasma generating device for dissociation therein by a plasma flame, including a fourth tubular element for maintaining a second sheath of plasma gas around the first sheath as a coolant prior to introduction of ions formed by dissociation into the analyzer.

12 Claims, 2 Drawing Sheets

REACTIVE GAS SAMPLE INTRODUCTION SYSTEM FOR AN INDUCTIVELY COUPLED PLASMA MASS SPECTROMETER

This invention relates to a torch system and method for introducing a sample of gas or vapor, such as a reactive gas or vapor, into an inductively coupled plasma for the subsequent analysis of said sample by analytical means, such as a mass spectrometer, a spectroscope or similar analytical means.

STATE OF THE ART

It is known to use an inductively coupled plasma torch for converting an elemental composition into ions for analysis by a mass spectrometer. The composition to be analyzed is dissolved in a solution which is introduced into the system by means of a nebulizer through which a controlled flow of argon is passed. Argon is fed to the inductively coupled plasma torch (ICP) at the output section thereof to provide and maintain a plasma flame similar to atomic emission spectroscopy.

Reference is made to U.S. Pat. No. 4,760,253 which issued on July 26, 1988, and which relates to the use of an inductively coupled plasma with a mass spectrometer adapted for the elemental analysis of a sample.

This patent is directed to a mass spectrometer in which at least some of the ions formed from a sample introduced into an inductively coupled plasma (ICP) are caused to enter a sampling member comprised of a front surface adjacent to the plasma, a rear surface, and a hole connecting the front and rear surfaces through which at least some of the ions pass.

The spectrometer described in the patent has a chamber in which a wall thereof comprises the rear surface of the sampling member. The pressure in the chamber is maintained substantially below atmospheric and at least some of the ions entering the chamber are caused to enter a mass analyzer. The improvement in the patent resides in providing the rear surface with a polish finish in order to reduce the intensity of background spectra which prevail in prior instruments and which limit the sensitivity of the instrument to certain elements.

Other prior art patents include U.S. Pat. Nos. 3,467,471; 4,551,609 and 4,688,935.

U.S. Pat. No. 3,467,471 relates to the production of a gas plasma and to the spectroscopic examination of the radiation emitted from the plasma from a sample, e.g., a phosphorus-containing sample, introduced into the plasma. The spectroscopic examination is used as a means for controlling manufacturing processes which require analysis of raw material or a product.

U.S. Pat. No. 4,551,609 is directed to a plasma burner or torch for emission spectrometry. The plasma burner described comprises an induction coil for generating a plasma, an outer jacket, an inner jacket coaxial with the outer jacket and a sleeve coaxially located inside the inner jacket. A capillary tube is located inside the sleeve and is oriented along the axis of symmetry. The torch or burner is provided with a cooling gas feed line, a plasma gas feed line, and an aerosol gas feed line. According to the patent, the rate of consumption of plasma gas as well as of the cooling gas is reduced, while the detection power of the device for such elements as boron, iron, magnesium, phosphorus and zinc is comparable to conventional plasma torches.

U.S. Pat. No. 4,688,935 is directed to the plasma spectroscopic analysis of organometallic compounds, particularly volatile, air or moisture sensitive or pyrophoric, liquid organometallic compounds. The method employed comprises inserting a sample of the compound into a flask referred to as an exponential dilution flask. Substantially the entire sample is allowed to vaporize and the vapor analyzed by plasma spectroscopy. Another method is disclosed in which the sample is decomposed by dropwise addition into frozen aqueous acid, diluting the decomposed sample with water and analyzing the diluted, decomposed sample by plasma spectroscopy.

Nebulization of solutions is a convenient way for sample introduction into an inductively coupled plasma system. It is considered a major step forward in mass spectrometry. Water solutions of the sample to be analyzed are employed. Gas is passed through the nebulizer and entrains the sample as an aerosol which is subsequently introduced into the ICP torch.

However, a disadvantage of this method is that it is not useful on samples which react with air or moisture, such as certain metallo-organic compounds. A case in point, is trimethylgallium, among others. If trimethylgallium is added to the solution, it tends to react, whereby the sample ultimately reaching the inductively coupled plasma section is not truly representative of the total trimethylgallium composition with respect to impurities, concentration, etc.

It would therefore be desirable to provide a system and a method in which samples of reactive gases and vapors can be accurately analyzed without the samples losing their integrity before reaching the plasma section of the torch.

OBJECTS OF THE INVENTION

It is thus an object of the invention to provide a torch system for introducing a gas or vapor, e.g., a reactive gas or vapor, into a plasma flame and effect thermal dissociation therein before the sample is introduced into a mass spectrometer for analysis.

Another object is to provide a method for introducing a sample of reactive gas or vapor into a plasma flame while maintaining the integrity of the sample from a composition view point up to its introduction into the plasma flame.

These and other objects will more clearly appear when taken in conjunction with the following disclosure, claims and the accompanying drawings.

IN THE DRAWINGS

STATEMENT OF THE INVENTION

In its broad aspect, the invention resides in a torch device wherein the sample, for example, a reactive gas or vapor, is introduced into the torch system without having to pass through the nebulizer but which in the course of passing through the torch is mixed with the nebulizer solution in the form of an aerosol or vapor dispersed in a plasma gas just before it enters the inductively coupled plasma means (ICP). A plasma gas is defined as a gas which produces gas plasma when excited in a high frequency electric field.

One embodiment of the invention resides in a torch device for use in preparing a sample of a reactive gas or vapor for analysis by a mass spectrometer or other type of analyzer cooperably associated with the torch device, such as an ICP-spectroscope. The torch device comprises a hollow elongated cylindrical body with an inductively coupled plasma means located at its output or forward section. The torch is provided with means for separately feeding a sample of the gas or vapor to be analyzed into a mixing chamber located rearward of the plasma means. The torch includes means for separately feeding a nebulizer flow of a plasma gas containing water or solvent vapor or an aerosol thereof into the mixing chamber to thereby mix with the sample, means being also provided for maintaining a sheath of plasma gas surrounding the sample mixture as it enters the plasma-forming means where it is thermally dissociated prior to introduction into the analyzer. Preferred examples of plasma gases include argon, nitrogen and helium which are inert.

Another embodiment comprises a torch in the form of a hollow elongated cylindrical body having an input section at one end and an output section at its other end cooperably associated with an inductively coupled plasma means. The torch includes means for feeding a sample to be analyzed to the input section of the torch through a tubular element located in the torch body, e.g., a centrally located tubular element, and into a mixing chamber located forward of the input section; means for separately feeding an annular flow of a nebulized vapor comprising a plasma gas containing water or solvent vapor or aerosol thereof concentrically surrounding and separated from the sample flow and into the mixing chamber to thereby form a mixture thereof with the sample for immediate feeding to said inductively coupled plasma means; means for feeding into and from the input section a first annular sheath of plasma gas concentrically surrounding the sample and nebulizer flow and directly to the inductively coupled plasma means, and finally means for feeding into and from the input section a second annular sheath of plasma gas surrounding the first annular sheath as a coolant directly to the inductively coupled plasma means; whereby the integrity of the sample is maintained as it enters the inductively coupled plasma means for thermal dissociation therein prior to entering the mass spectrometer.

Figure 1:
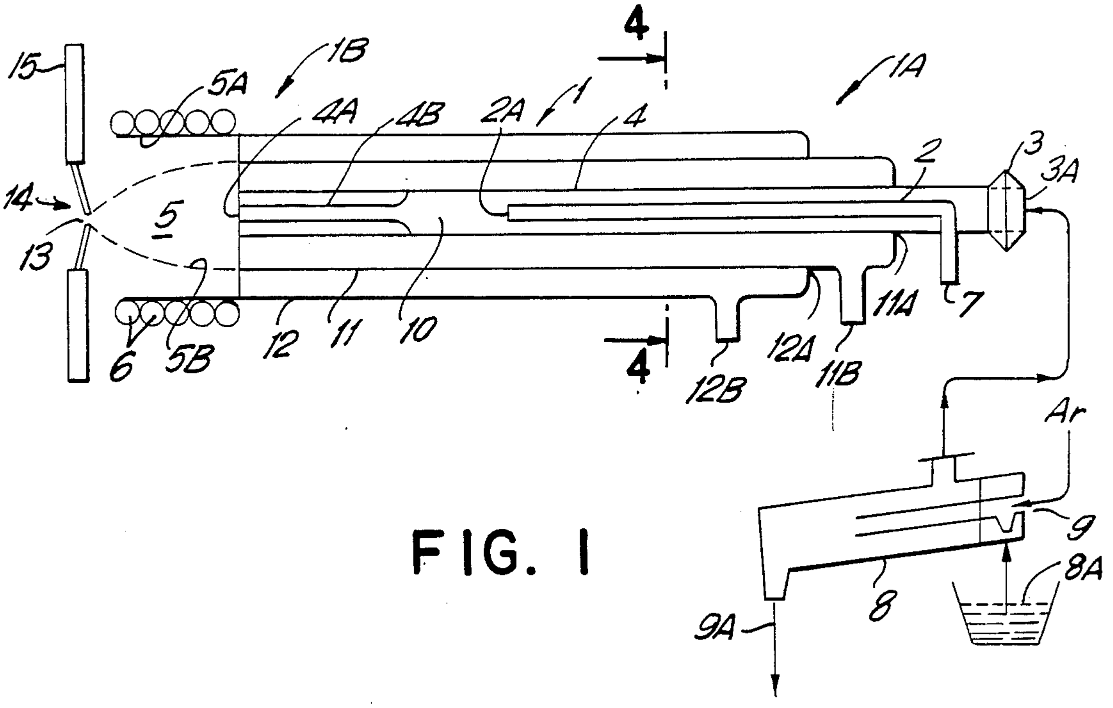
FIG. 1 is a schematic diagram of the torch illustrating one embodiment of the invention.

FIG. 1 is illustrative of one embodiment of the torch device of the invention, the torch being identified generally by numeral 1 and comprising a concentric arrangement of quartz tubes, the torch device having an input section 1A and an output section 1B. The arrangement comprises a substantially centrally located tubular element 2 supported axially which has a feed inlet 7 which communicates with tubular element 2 and through which the sample of gas or vapor to be analyzed is fed.

The tubular element 2 extends to a distance intermediate to the input and output sections and terminates substantially at 2A. Element 2 is surrounded by tubular element 4 which is sealed to and extends from flange 3 as shown to beyond end 2A of element 2 and terminates substantially at 4A short of inductively coupled plasma means 5 at the output section, the inductively coupled plasma means comprising water cooled coils 6 which is activated by high frequency electrical means not shown. The forward portion of tubular element 4 is slightly constricted at 4B.

Tubular element 4 is employed to provide a nebulizer flow to the output section and is isolated from the sample flow from the inlet end up to an internal mixing chamber 10 located intermediate the input and output sections of the torch device to be discussed later.

Tubular element 4 has an inlet port 3A which is coupled to pneumatic nebulizer 8. The nebulizer has an inlet 9 for receiving a plasma gas, e.g., argon (Ar), which aspirates and entrains nebulizer solution 8A which is converted into a vapor or aerosol and caused to flow into inlet 3A of nebulizer flow tube 4. Excess solution is drained through drain means 9A.

The arrangement of the sample tube 2 to nebulizer flow tube 4 is such as to provide an internal mixing chamber 10 located intermediate the input and output sections of the torch. There the gas sample is mixed with the vapor or aerosol of the nebulizer flow and the mixture immediately caused to flow into chamber 5A of the inductively coupled plasma means where the sample is thermally dissociated. To assure plasma formation, additional flow of plasma gas is provided through concentrically arranged quartz tubes 11, 12. Tubular element 11 which concentrically surrounds element 4 is used to provide auxiliary flow of plasma gas, such as argon (Ar). Starting at the inlet end, tube 11 is sealed to tube 4 at 11A and has an inlet port 11B into which the argon or other plasma gas is passed from a gas reservoir not shown. Tube 11 extends to the output section of the torch as shown. The plasma gas enters chamber 5A of the inductive coupled plasma means where it is ionized by high frequency electric field flowing through coil 6 to provide plasma flame 5B.

In addition to the auxiliary flow of argon through tubular element 11, an additional annular flow of plasma gas is provided as a coolant through outermost tube 12 which extends from the inlet section 1A to the output section 1B as shown. The tube is sealed at the inlet section to tube 11 at 12A and has an inlet port 12B through which plasma gas coolant is fed, e.g., argon (Ar).

By using the system illustrated in the schematic of FIG. 1, the mixing of the reactive gas or vapor with the nebulizer gases or aerosol in nebulizer 8 itself is avoided and hence the disadvantages of said premature mixing. Thus, the composition integrity of the reactive gas or vapor is retained until it is mixed with the nebulizer flow within the torch immediately before chamber 5A where it is dissociated, for example, thermally dissociated. The ions formed in the plasma flame are caused to pass through aperture 13 of sampling means 14 mounted on a water-cooled flange 15 and then into the analyzer for analysis, for example, a mass spectrometer. In this connection, reference is made to U.S. Pat. No. 4,760,253.

Figure 4:
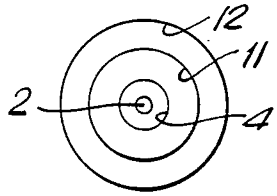
FIG. 4 is a cross section of the torch taken along line 4—4 of FIG. I.

Referring to the cross section of FIG. 1 taken along line 4—4 as shown in FIG. 4, the concentric arrangement of the tubular elements clearly appear with sample tube 2 located at substantially the center which in turn is concentrically surrounded by nebulizer flow tube 4. Tube 4 is surrounded by auxiliary flow tube 11 which in turn is surrounded by tube 12 through which coolant plasma gas flows from the input end to the output end of the torch device.

Figure 2:
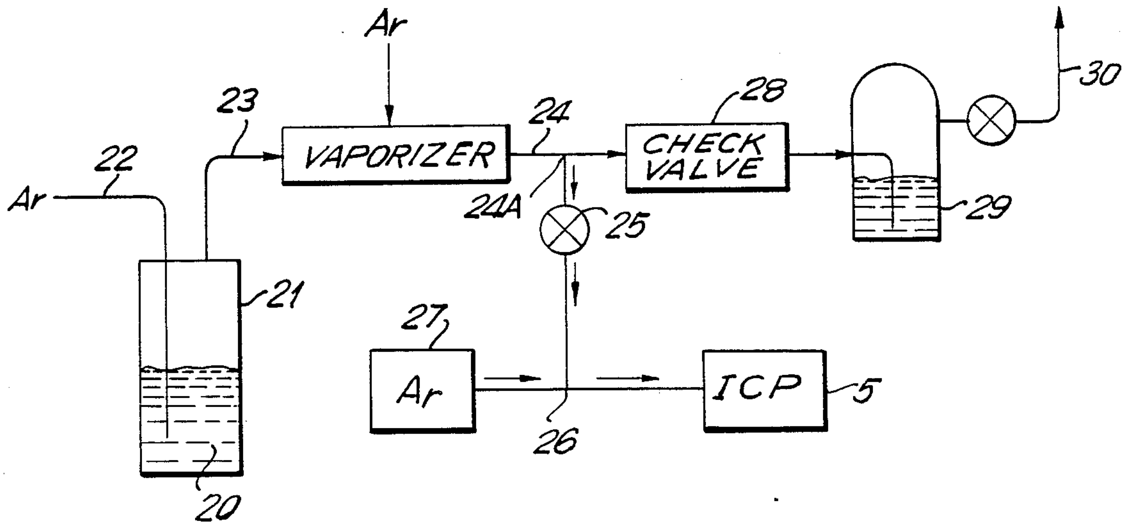
FIG. 2 is a flow sheet illustrating one method of sample preparation.

One method for preparing the reactive gas sample or vapor is shown in the flow sheet of FIG. 2. A liquid of trimethygallium 20 is placed in bubbling device 21 and a plasma gas (e.g., argon) fed via line 22. The saturated argon is sent through a heat exchanger or vaporizer via line 23 to which argon is also fed to insure that any droplets or aerosol is transformed to the vapor phase. Following vaporization, the reactive gas or vapor is passed along line 24 to a "T" connection 24A from which a branch line extends to and through check valve 28 and a bleed-off branch line extends to and through gas flow regulating means 25. The trimethylgallium passes through check valve 28 and is maintained at about 1 psig (lbs/in$^2$ gage). The gas is caused to flow under positive pressure, for example, 0.5 psig to about 25 psig or higher. Part of the flow is passed through gas flow regulating means 25 to a "T" connection 26 and a plasma gas, e.g., argon (Ar) 27 added and caused to flow together with the trimethylgallium to the inductively coupled plasma means 5 (ICP) as shown.

The remaining reactive gas or vapor passe through check valve 28 and is introduced into bubbler or scrubber 29 so that the gas is not conveyed to the atmosphere. The bubbler contains a solvent, in this case a Lewis base diamyl ether, for taking up trimethylgallium which is Lewis acid. The scrubbed plasa-forming gas is discharged through line 30.

Where the sample being analyzed is a Lewis acid, the solution used as a scrubber is a Lewis base. Alternatively, where the sample is a Lewis base, the scrubbing solution would be a Lewis acid. The reaction product of a Lewis acid and a Lewis base is referred to as an adduct.

Thus, the sample to be analyzed could be a Lewis base, such as trimethylarsine and phosphine.

Examples of Lewis acids are boron trifluoride, trimethylborane, trimethylaluminum, and other metal alkyl compounds.

Other examples of Lewis bases include diamyl ether, triakylphosphate, and tributylphosphate, among others. The Lewis bases should have a low vapor pressure.

A preferred use of the nebulizer is to include an element as a reference standard in order to tune and calibrate the mass spectrometer. One standard which has been used is the element indium which is added to the nebulizer solution in the form of an indium standard solution purchased from Spex Industries. Other standards may be employed in accordance with conventional analytical procedures. Such standards may comprise salts of copper, nickel, cadmium, etc.

When the reactive trimethylgallium gas is passed through tube 2 of FIG. 1, clogging is apt to occur after a given period of time at its exit end 2A. One way of inhibiting clogging is to surround tube 2 by another tube through which a cover gas of argon or other plasma gas is passed, the cover gas tube terminating at approximately the same distance 2A of feed tube 2.

Figure 3:
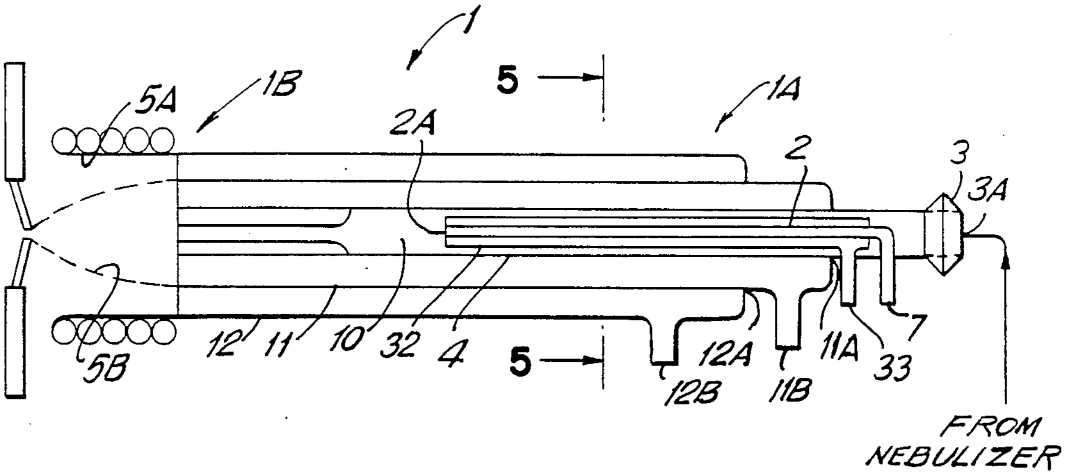
FIG. 3 is a schematic of another embodiment of a torch for carrying out the invention.

This preferred embodiment is shown in FIG. 3, like elements having the same numerals as in FIG. 1. Thus, referring to FIG. 3, the torch is indicated generally by the numeral 1 and comprising a concentric arrangement of tubular elements, the torch device similarly having an input section IA and an output section 1B. Centrally located tubular element 2 is depicted supported axially as shown. Nebulizer tube 4 is sealed to flange 3 and has a feed inlet 3A for the nebulizer flow shown in more detail in FIG. 1.

Tubular element 2 has a sample inlet port 7 and extends to a distance intermediate to the input and output sections and terminates substantially at 2A. Element 2 is surrounded by cover gas tube 32 which has an inlet port 33 through which a cover gas of argon is passed, tube 32 being sealed to tube 2.

The tube 4 for the nebulizer flow surrounds the cover gas tube and has an inlet port 3A into which a nebulizer flow is introduced from a nebulizer not shown but which is illustrated in FIG. 1. The nebulizer tube element terminates at 4A as shown.

The remaining elements are the same as in FIG. 1. Thus, to assure plasma formation, additional flow of plasma gas is provided through concentrially arranged quartz tubes 11, 12. Tube 11 concentrically surrounds nebulizer flow tube 4 and is used to provide auxiliary flow of plasma gas. The tube is sealed at the inlet section to tube 4 at 11A while outermost tube 12 is sealed to tube 11 at 12A. Tubes 11 and 12 have inlet ports 11B and 12B, respectively, for receiving plasma gas. The two tubes extend to the output section as in FIG. 1 and function in the same manner.

Figure 5:
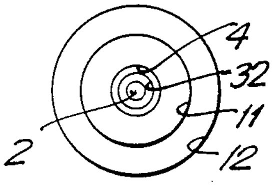
FIG. 5 is a similar cross section taken along line 5—5 of FIG. 3.

FIG. 5 is a cross section of the torch shown in FIG. 2 taken along line 5—5 in which sample tube 2 is surrounded by cover gas tube 32 which in turn is surrounded by nebulizer flow tube 4 followed concentrically by tubes 11 and 12.

The embodiments shown in FIGS. 1–5 enable the analysis of reactive compounds such as trimethylgallium. Examples of other compounds include $WF_6$, $In(CH_3)_3$, $SiH_4$ and $PH_3$.

The torch device of the invention is particularly applicable to analyzing trialkyl and dialkyl metal compounds which tend to react with water and oxygen.

Another embodiment of the invention resides in a method for preparing a sample of a reactive gas or vapor for analysis by a mass spectrometer in which a torch device is employed comprised of a hollow elongated cylindrical body having an output section cooperably associated with an inductively coupled plasma generating means and a mixing chamber located rearwardly of the output section.

The method comprises feeding a sample of the reactive gas or vapor to said mixing chamber 10, separately feeding a nebulizer flow of plasma gas mixed with water vapor or an aerosol thereof into the same mixing chamber to effect mixing of the sample and the nebulizer flow, and immediately feeding the mixture surrounded by an annular sheath of plasma gas into and through the output section for thermal dissociation by a plasma flame generated in the output section prior to analysis by the mass spectrometer.

The invention also provides a method for preparing a sample before the introduction of the sample into the system for analysis. The method comprises confining a liquid form of said sample in a bubbler device, bubbling a stream of carrier gas into the liquid sample and thereby entrain at least a portion of said sample into the stream of carrier gas, and passing the stream of carrier gas with the entrained sample to a vaporizer and from there under moderate pressure just above atmospheric pressure to a line that bifurcates to provide branch line extending to and through a check valve and a bleed-off branch extending to and through a shut-off valve. A portion of the gas stream is adapted to pass through the bleed-off valve and the remainder of the gas stream to pass through the check valve.

The bleed-off portion is passed to a gas line connected to a source of plasma gas adapted to flow to the ICP means, thereby delivering the sample thereto. The remainder of the sample and carrier gas is passed through the check valve to a scrubber containing a solvent for the sample, thereby separating the sample from the carrier gas, the separated carrier gas being then discharged from the scrubber.

As stated herein, when the sample is a Lewis acid, the scrubber solution is a Lewis base and vice versa.

The method of the invention enables the analysis of reactive compounds, such as trimethylgallium, with optimum accuracy.

The following advantages are achieved with the invention:

(1) It allows a wet plasma to be used which is the normal condition for which the inductively coupled plasma-mass spectrometer (ICP-MS) is designed;

(2) It increases the sensitivity of the ICP-MS for analyzing reactive samples, such as metal alkyls;

(3) It provides a safe way of handling reactive liquids before introduction to ICP-MS.

(4) It allows a standard to be introduced into the nebulizer flow which does not affect the sample in order to tune and calibrate the mass spectrometer for optimal performance levels.

Although the present invention has been described in conjunction with the preferred embodiment, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A method for preparing a sample of a reactive gas or vapor for introduction to an analyzer which comprises:

providing a torch device comprised of a hollow elongated cylindrical body having an output section with an inductively coupled plasma generating means surrounding said section, said torch having a mixing chamber disposed rearwardly of said output section and in communication therewith, feeding a sample of said reactive gas or vapor to said mixing chamber, separately feeding a nebulizer flow of a plasma gas mixed with water or solvent vapor or an aerosol thereof into said mixing chamber to effect mixing of said sample and said nebulizer flow, and immediately feeding said mixture surrounded by an annular sheath of plasma-forming gas through said output section for dissociation by a plasma flame generated in said section prior to introduction of the dissociated sample into the analyzer.

2. The method of claim 1, wherein the nebulizer flow also includes a standard for use in tuning and calibrating the analyzer to provide optimum performance levels.

3. The method of claim 2, wherein the analyzer is a mass spectrometer.

4. A method for preparing a sample for the analysis thereof following thermal treatment of the sample in an inductively coupled plasma means (ICP) which comprises:

confining a liquid form of said sample in a bubbler device, bubbling a stream of carrier gas into said liquid sample and thereby entrain at least a portion of said sample into said stream of carrier gas, causing said stream of carrier gas with the entrained sample to flow to a line that bifurcates to provide a branch line extending to a scrubber and a bleed-off branch line extending to and through a gas regulating means, whereby a portion of the gas stream with the entrained sample is adapted to pass through said bleed-off line and the remainder of said gas stream adapted to pass to said scrubber, passing said bleed-off portion to a gas line connected to a source of plasma gas adapted to flow to said ICP means, thereby delivering the sample thereto, causing the remainder of said sample and carrier gas to pass to said scrubber containing a solvent for said sample, thereby separating said sample substantially from said carrier gas, and discharging said separated carrier gas from said scrubber.

5. The method of claim 4, wherein the sample is selected from the group consisting of a Lewis acid or a Lewis base, and wherein the solvent is selected from the group consisting of a Lewis base or Lewis acid, such that when the sample is a Lewis acid, the solvent is a Lewis base and when the sample is a Lewis base, the solvent is a Lewis acid.

6. The method of claim 4, wherein the moderate pressure of the sample flowing along the branch line to said scrubber is approximately 1 psig.

7. A method for preparing a sample for the analysis thereof following thermal treatment of the sample in an inductively coupled plasma means (ICP) which comprises:

confining a liquid form of said sample in a bubbler device, said sample being selected from the group consisting of a Lewis acid or a Lewis base, bubbling a stream of carrier gas into said liquid sample and thereby entrain at least a portion of said sample into said stream of carrier gas, passing said stream of carrier gas with the entrained sample to a vaporizer and from there under moderate pressure just above atmospheric to a line that bifurcates to provide a branch line extending to a scrubber and a bleed-off branch line extending to and through gas flow regulating means, whereby a portion of the gas stream with the entrained sample is adapted to pass through said bleed-off line and the remainder of said gas stream adapted to pass to said scrubber, passing said bleed-off portion to a gas line connected to a source of plasma gas adapted to flow to said IPC means, thereby delivering the sample thereto, causing the remainder of said sample and carrier gas to pass to a scrubber containing a solvent for said sample, thereby separating said sample substantially from said carrier gas, said solvent being selected from the group consisting of a Lewis base or a Lewis acid, such that when the sample is a Lewis acid, the solvent is a Lewis base and when the sample is a Lewis base, the solvent is a Lewis acid, and discharging said separated carrier gas from said scrubber.

8. The method of claim 7, wherein the sample is a Lewis acid consisting essentially of trimethygallium and wherein the solvent is a Lewis base consisting essentially of diamyl ether.

9. A torch device for use in analyzing a gas or vapor comprising an elongated cylindrical body having an input section at one end and an output section at its other end cooperably associated with an inductively coupled plasma generating means which is cooperably associated with an analyzer which comprises:

means for feeding a sample of a reactive gas or vapor to be analyzed to the input section of said torch through a first tube located in said torch body, said tube extending from the input section to and terminating at a distance intermediate the input section and the output section, a second tube concentrically and annularly surrounding said first tube extending from said input section to beyond the terminus of said first tube and to said output section, said second tube being constricted near the output section and forward of the terminus of said first tube, the terminus of said first tube terminating at a distance before said constriction such as to provide a mixing chamber between said terminus and said constriction, means for separately feeding an annular flow of a nebulized vapor comprising a plasma gas and including water or solvent vapor or aerosol thereof through said second tube surrounding and separated from said sample in said first tube and into said mixing chamber to thereby form a mixture thereof with the sample for immediate feeding to said inductively coupled plasma means, means for feeding into and from said input section a first annular sheath of plasma gas concentrically surrounding said second tube and directly to said inductively coupled plasma means, and means for feeding into and from said input section a second annular sheath of plasma gas as a coolant surrounding said first annular sheath directly to said inductively coupled plasma generating means, whereby the integrity of said sample is maintained as it enters said inductively coupled plasma means for dissociation therein prior to entering the analyzer.

10. The torch device of claim 9, wherein said first tube for feeding said gas or vapor sample to the mixing chamber is concentrically located within a cover gas tube which extends to approximately the end or terminus of this first tube and through which a plasma gas flows to inhibit clogging of the first tube near the mixing chamber.

11. A torch device for introducing a reactive gas or vapor into a plasma flame and effect dissociation therein and from there introduced into a mass spectrometer for analysis: said device comprising a cylindrical longitudinal torch body having an output section and an input section and characterized by a plurality of concentrically arranged tubular members extending from this input section towards the output section and defining a plurality of annular passages therebetween for passing gas or vapor therethrough, said torch body terminating into a nozzle section at said output section at which a plasma flame is generated, said torch body comprising, a first centrally located tube extending from the input section with its terminus extending to a position intermediate to said input and output section for receiving therein a sample of reactive gas or vapor to be analyzed, a second tube concentrically surrounding said first tube with its end extending beyond the terminus of said first tube and being constricted, the terminus of said first tube terminating at a distance before said constriction such as to define a first mixing chamber between said terminus and said constriction, said second tube also defining an annular passage surrounding said first tube for receiving a nebulizing gas flow. of a plasma gas and including water or solvent vapor or aerosol thereof for mixing with the reactive gas or vapor in said first mixing chamber forward of said first tube, a third tube concentrically surrounding said second tube with its end extending to approximately the end of said second tube and defining an annular passage therebetween for receiving plasma gas therethrough, and a fourth tube concentrically surrounding said third tube and defining an annular passage for receiving a plasma gas therein, said fourth tube extending beyond the end of said third tubular member and defining a second chamber forward of said third tubular member, said second chamber including said nozzle section in which a plasma flame is generated, whereby reactive gas or vapor fed from the input section through said first tube mixes with the nebulizing flow of gas in an atmosphere of plasma gas in said first mixing chamber and the mixture immediately thereafter dissociated by a plasma flame initiated in the nozzle section of the second chamber of said torch body.

12. The torch device of claim 11, wherein said first centrally located tube is disposed within a cover gas tube which extends to approximately the end of said first tube and through which a plasma gas flows to inhibit clogging of the first tube at substantially the first mixing chamber.

* * * * *